US006989959B2

(12) United States Patent
Chang et al.

(10) Patent No.: US 6,989,959 B2
(45) Date of Patent: Jan. 24, 2006

(54) DRIVE LEVEL FLOW-FIELD CONDITIONING TO REDUCE FLOW FIELD TURBULENCE

(75) Inventors: Yu-Li Chang, Prior Lake, MN (US); Bijoyendra Nath, Minneapolis, MN (US); Ram M. Rao, Roseville, MN (US); Scott E. Ryun, Prior Lake, MN (US); Zine-Eddine Boutaghou, Vadnais Heights, MN (US); Adam K. Himes, Richfield, MN (US); Markus E. Mangold, Minneapolis, MN (US); Kent J. Forbord, St. Louis Park, MN (US); Su Xia, Eden Prairie, MN (US); Menachem Rafaelof, Superior, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/881,547

(22) Filed: Jun. 14, 2001

(65) Prior Publication Data

US 2002/0075591 A1     Jun. 20, 2002

Related U.S. Application Data

(60) Provisional application No. 60/286,483, filed on Apr. 26, 2001, provisional application No. 60/263,629, filed on Jan. 23, 2001, provisional application No. 60/232,036, filed on Sep. 12, 2000, provisional application No. 60/211,553, filed on Jun. 14, 2000.

(51) Int. Cl.
*G11B 33/08*     (2006.01)

(52) U.S. Cl. .................................. 360/97.02; 360/97.03
(58) Field of Classification Search ............. 360/97.02, 360/97.03, 97.04

See application file for complete search history.

(56) References Cited

U.S. PATENT DOCUMENTS

| | | | |
|---|---|---|---|
| 3,838,461 A * | 9/1974 | Barbeau et al. | 360/98.03 |
| 3,839,734 A | 10/1974 | George et al. | 360/102 |
| 3,846,835 A | 11/1974 | Horovitz et al. | 360/98 |
| 4,583,213 A | 4/1986 | Bracken et al. | 369/261 |
| 4,636,891 A | 1/1987 | Barski | 360/97 |
| 4,660,110 A | 4/1987 | Iida et al. | 360/98 |
| 4,821,130 A | 4/1989 | Bernett et al. | 360/78.04 |
| 4,879,618 A | 11/1989 | Iida et al. | 360/106 |
| 5,036,416 A | 7/1991 | Mastache | 360/105 |
| 5,541,791 A | 7/1996 | Yamasaki et al. | 360/105 |
| 5,854,725 A | 12/1998 | Lee | 360/106 |
| 5,999,372 A | 12/1999 | Peterson et al. | 360/106 |
| 6,091,570 A | 7/2000 | Hendriks | 360/97.03 |
| 6,097,568 A | 8/2000 | Ekhoff | 360/97.02 |
| 6,462,901 B1 * | 10/2002 | Tadepalli | 360/97.03 |
| 6,493,310 B1 * | 12/2002 | Kim et al. | 720/611 |

FOREIGN PATENT DOCUMENTS

EP       1349169 A2 *   10/2003

(Continued)

*Primary Examiner*—William J Klimowicz
(74) *Attorney, Agent, or Firm*—Westman, Champlin & Kelly, P.A.

(57) ABSTRACT

A flow control device for a data storage system to reduce flow induced vibration. The flow control device includes a plurality of streamline flow passages to reduce turbulent flow in a flow field along a disc surface. Thus, air flow induced by rotation of data discs is directed through the plurality of streamline flow passages to reduce turbulence to limit excitation or vibration of the head and suspension components.

21 Claims, 12 Drawing Sheets

FOREIGN PATENT DOCUMENTS

| | | | |
|---|---|---|---|
| JP | 54154310 A | * | 12/1979 |
| JP | 56169263 A | * | 12/1981 |
| JP | 59094273 A | * | 5/1984 |
| JP | 01192075 A | * | 8/1989 |
| JP | 2-50379 A | | 2/1990 ............. 360/97.02 |
| JP | 02050379 A | * | 2/1990 |
| JP | 02061885 A | * | 3/1990 |
| JP | 03097176 A | * | 4/1991 |
| JP | 03216887 A | * | 9/1991 |
| JP | 04098671 A | * | 3/1992 |
| JP | 05062451 A | * | 3/1993 |
| JP | 05135562 A | * | 6/1993 |
| JP | 2000322870 A | * | 11/2000 |
| JP | 2000322871 A | * | 11/2000 |
| JP | 2000357385 A | * | 12/2000 |

* cited by examiner

DRIVE LEVEL FLOW-FIELD CONDITIONING TO REDUCE FLOW FIELD TURBULENCE

CROSS-REFERENCE TO RELATED APPLICATIONS

The present application claims priority to U.S. Provisional Application Ser. No. 60/211,553, filed Jun. 14, 2000 and entitled "DRIVE LEVEL FLOW-FIELD CONDITIONING FOR WINDAGE REDUCTION", U.S. Provisional Application Ser. No. 60/232,036, filed Sept. 12, 2000 and entitled "METHODS FOR REDUCTION OF THE EFFECT OF AIR TURBULENCE INSIDE DISC DRIVES", U.S. Provisional Application Ser. No. 60/263,629, filed Jan. 23, 2001, and entitled "AIRFLOW REGULATING FEATURES TO HELP REDUCE AIRFLOW INDUCED VIBRATION ON SUSPENSION ARMS"; and U.S. Provisional Application Ser. No. 60/286,483, filed Apr. 26, 2001 and entitled "AIRFLOW REGULATING FEATURES TO HELP REDUCE AIRFLOW INDUCED VIBRATION ON SUSPENSION, ARMS AND DISCS".

FIELD OF THE INVENTION

The present invention relates to a data storage device. In particular, the present invention relates to a flow field conditioning device to reduce flow turbulence in a flow field along the disc surface.

BACKGROUND OF THE INVENTION

Data storage devices store digital information on a rotating disc. Heads are supported relative to the surface of the rotating disc to read data from or write data to the disc. Rotation of the disc creates an air flow path or flow-field proximate to the disc surface. For proximity or near proximity recording, head transducer elements are carried on an air bearing slider to form the read/write head. The air bearing slider is supported relative to the disc surface by a suspension assembly coupled to an actuator arm of an actuator assembly. Turbulent air flow in the flow-field proximate to the air bearing slider or slider suspension can excite or vibrate the head and suspension components. Vibration of the head or suspension components can excite resonance mode frequencies of the head suspension assembly increasing head-disc spacing modulations or introduce off-track motion to the head which can degrade read-write operations. The present invention addresses these and other problems and offers solutions not previously recognized nor appreciated.

SUMMARY OF THE INVENTION

The present invention relates to a flow control device for a data storage system to reduce flow induced vibration. The flow control device includes a plurality of streamline flow passages to reduce turbulent flow in a flow field along the disc surface. These and various other features as well as advantages which characterize the present invention will be apparent upon reading the following detailed description and review of the associated drawings.

BRIEF DESCRIPTION OF THE DRAWINGS

FIG. 2-1 is an elevational view of an embodiment of a flow gate structure of a flow control device.

FIG. 2-2 is a cross-sectional view of the embodiment of the flow gate structure of FIG. 2-1 taken along line 2-2—2-2 of FIG. 2-1.

FIG. 3-1 is a perspective illustration of an embodiment of a flow gate structure of a flow control device.

FIG. 3-2 is an elevational view of the embodiment of a flow gate structure of a flow control device as illustrated in FIG. 3-1.

FIG. 3-3 is a cross-sectional view of the embodiment of the flow gate structure of FIG. 3-2 taken along line 3-3—3-3 of FIG. 3-2.

FIG. 6-1 is a schematic illustration of an embodiment of a flow control device including a plurality of flow passages for redirecting flow.

FIG. 6-2 is a schematic illustration of the flow passages of the flow control device of FIG. 6-1.

FIG. 7-1 is a schematic illustration of operation of the flow control device of FIGS. 6-1–6-2 to direct flow generally inwardly away from a head suspension assembly.

FIG. 7-2 is a schematic illustration of operation of the flow control device of FIGS. 6-1–6-2 to direct flow generally outwardly away from the head suspension assembly.

DETAILED DESCRIPTION OF ILLUSTRATIVE EMBODIMENTS

Figure 1:
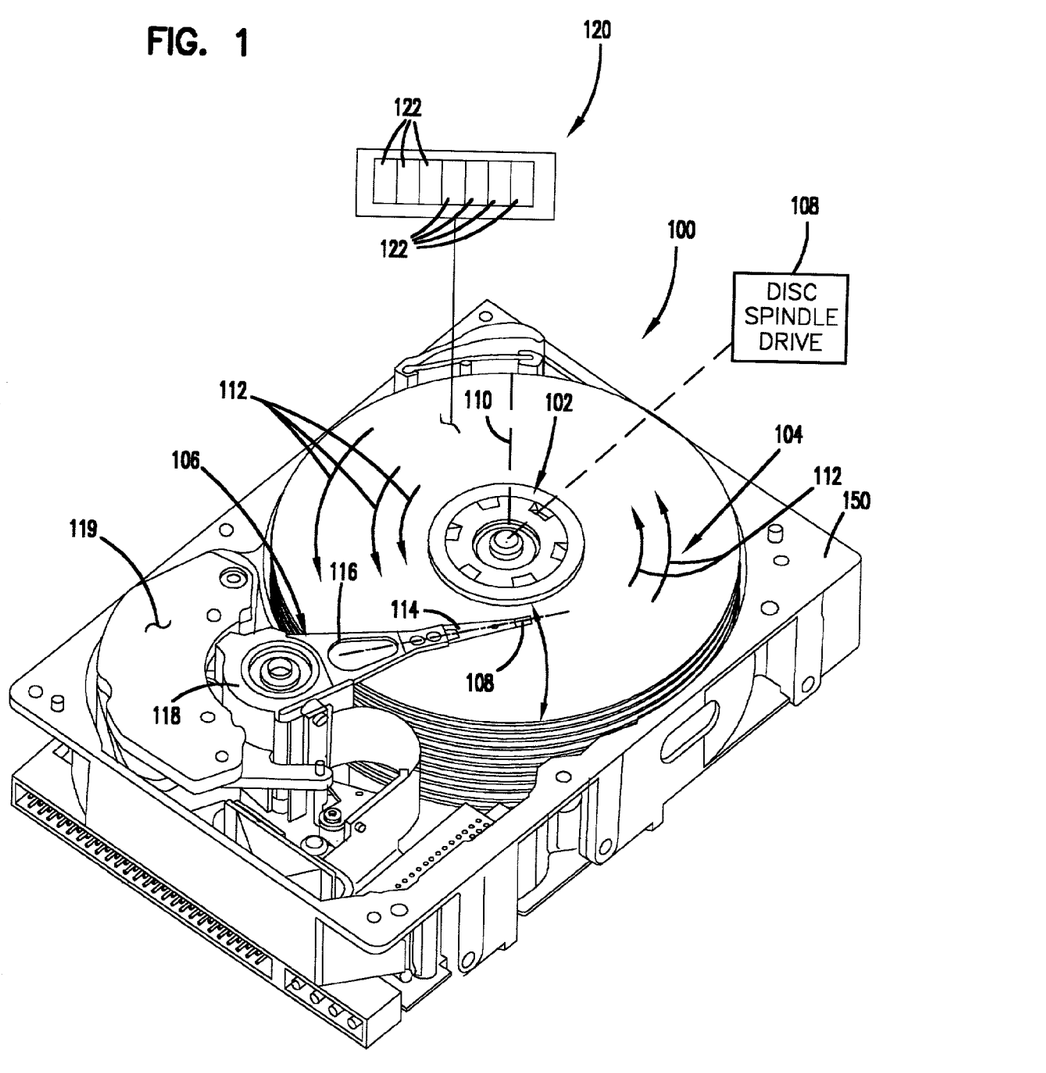
FIG. 1 is a perspective illustration of a data storage system including a flow control or conditioning device.

FIG. 1 illustrates an embodiment of a data storage device 100 including a spindle assembly 102 supporting discs 104 adapted to store digital information. A head assembly 106 supports a plurality of heads 108 relative to surfaces of discs 104 to read information from or write information to the discs 104. The spindle assembly 102 includes a spindle driver 108 (illustrated schematically) which rotates discs 104 about a spindle axis 110 for read or write operations.

Rotation of discs 104 creates an air flow stream or flow field along the disc surface as illustrated by arrows 112 in FIG. 1. This air flow stream or flow field can be turbulent proximate to the head assembly 106. Head assembly 106 includes a head 108 supported by a resilient suspension assembly 114 coupled to an actuator arm 116 of an actuator block 118. Actuator block 118 is powered by a voice coil motor 119 to move the head assembly 106 for read/write operations. Turbulent flow proximate to the head assembly 106 can vibrate or excite the suspension components, actuator arm or head 108. Excitation of the head and suspension components can introduce resonance mode vibration increasing off-track movement of the heads and head disc spacing modulation.

The present invention relates to a flow field control or conditioning device illustrated schematically by block 120 in FIG. 1 to reduce flow field turbulence. In particular, the present invention relates to a flow control device 120 that reduces large scale vortices in the flow field to reduce the amplitude of the flow induced vibration of the head and suspension components. In illustrated embodiment of FIG. 1, the flow control device 120 includes a plurality of streamline flow passages 122. The flow device 120 is supported in the flow path or flow field proximate to the disc surface. The streamline flow passages 122 have a constant cross-sectional area or dimension to provide a streamline passage for flow along a length thereof to smooth turbulence and provide a more laminar flow field over the suspension components to reduce excitation or vibration of the head and suspension components. In another embodiment, the flow passages of the flow conditioning device can be formed to direct flow generally inwardly or outwardly away from the suspension components as will be described.

Figure 21:
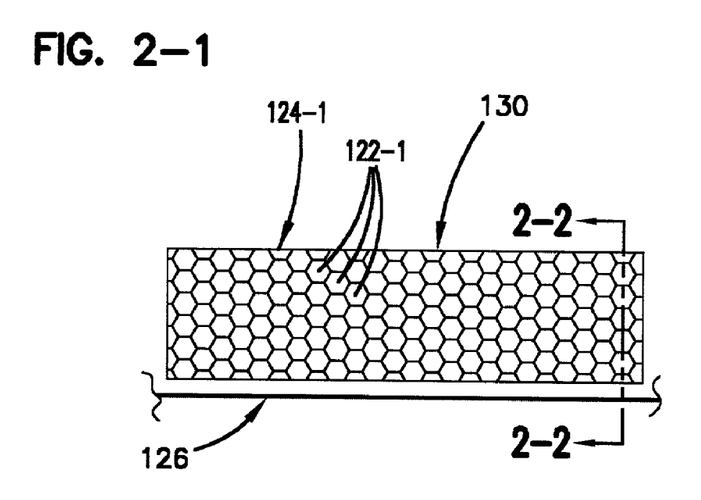
Figure 22:
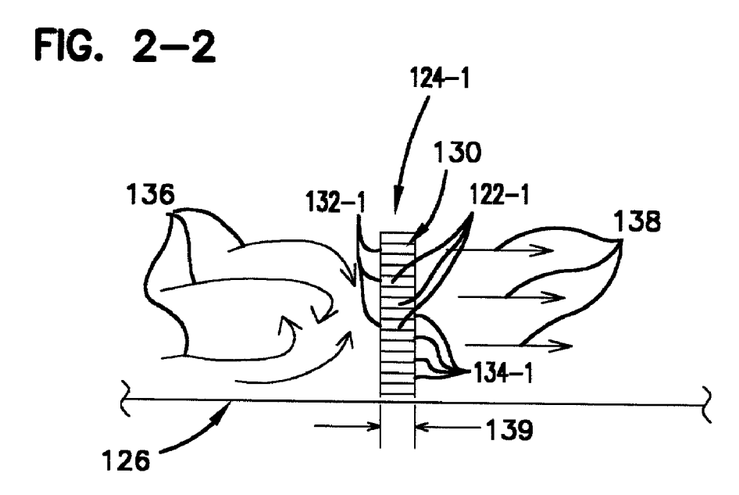

FIGS. 2-1 and 2-2 illustrate one embodiment of a flow control device including a flow gate 124-1 supported in the flow field proximate to a disc surface 126. As shown, flow gate 124-1 is formed of a honeycomb structure 130 supported above the disc surface 126. The honeycomb structure 130 forms the plurality of streamline flow passages 122-1 having a constant cross-sectional dimension along a length thereof to provide a more laminar flow in the flow field. As shown in FIG. 2-2, the streamline flow passages 122-1 include an inlet 132-1 and an outlet 134-1 spaced from the inlet 132-1 and have a constant cross-sectional dimension between the inlet 132-1 and outlet 134-1. Turbulent flow illustrated by arrows 136 flows into the inlet 132-1 along the flow passages 122-1 and is discharged from outlet 134-1.

Turbulent air which passes through the flow passages 122-1 is discharged as more laminar flow as illustrated by arrows 138 to reduce turbulence in the flow field to reduce flow induced vibration of the head and suspension components. The flow controller also reduces pressure and velocity acting on the suspension components and the head. A thickness 139 of the flow gate 124-1 defines a length of the flow passages 122-1 between inlet 132 and outlet 134. The thickness is designed to provide a flow passage length which reduces turbulence in the flow field without introducing unacceptable drag to the rotating disc due to the shear force between interfacing surfaces of the flow gate 124-1 and the rotating disc 104. Drag between the interfacing surfaces can increase power requirements of the spindle driver 108.

Figure 31:
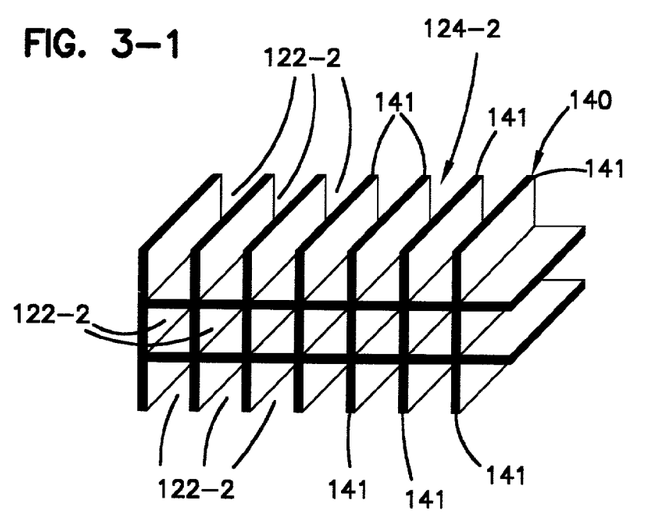
Figure 32:
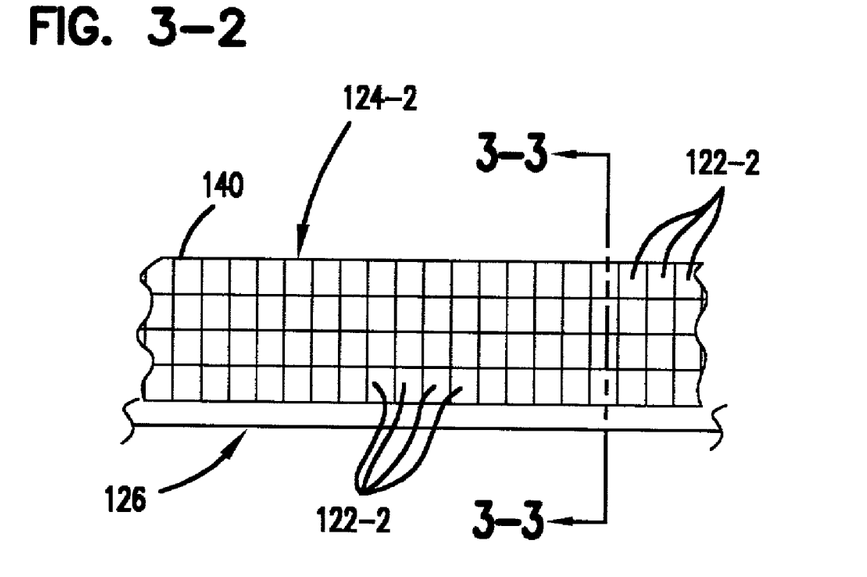
Figure 33:
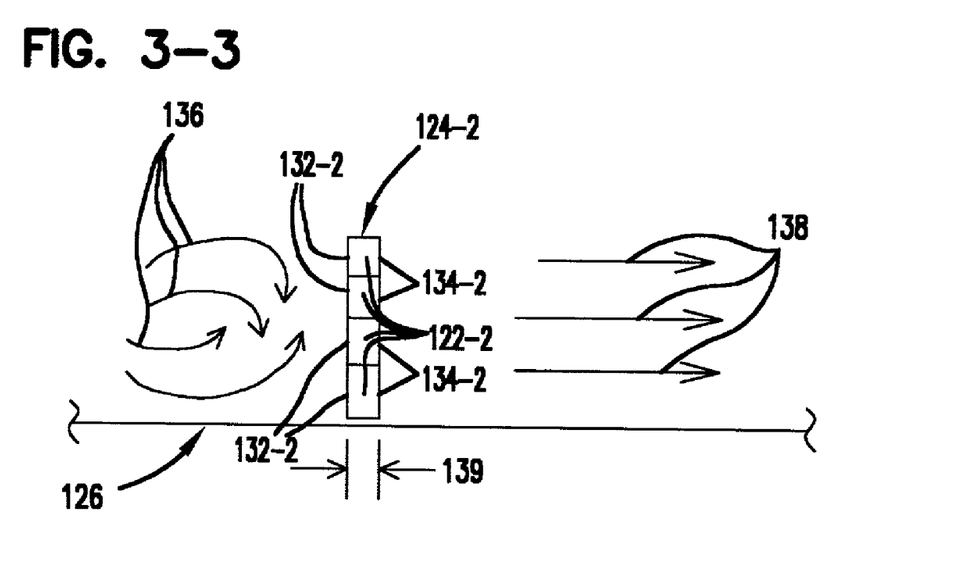
Figure 61:
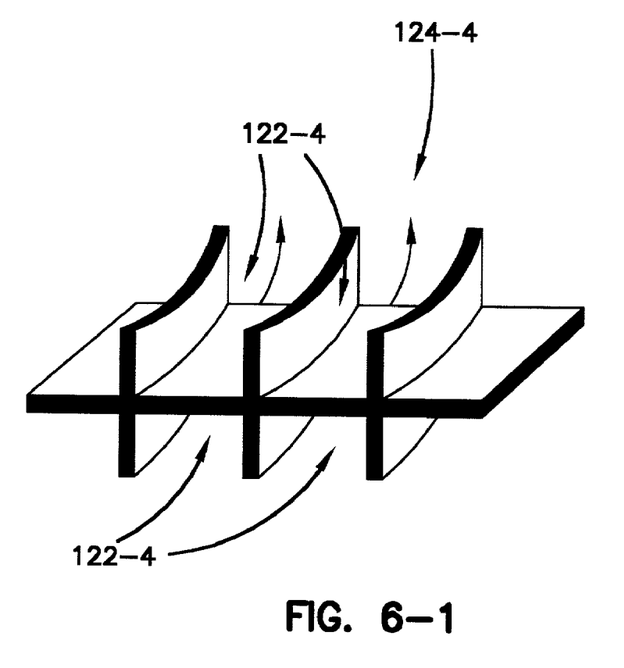
Figure 62:
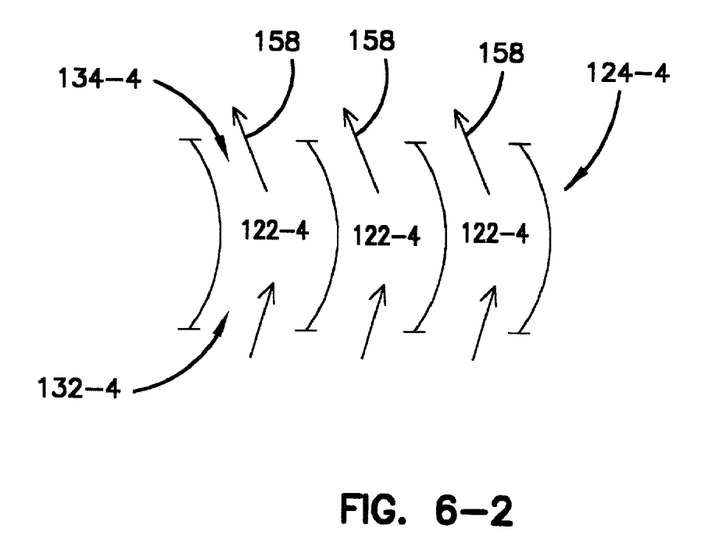
Figure 71:
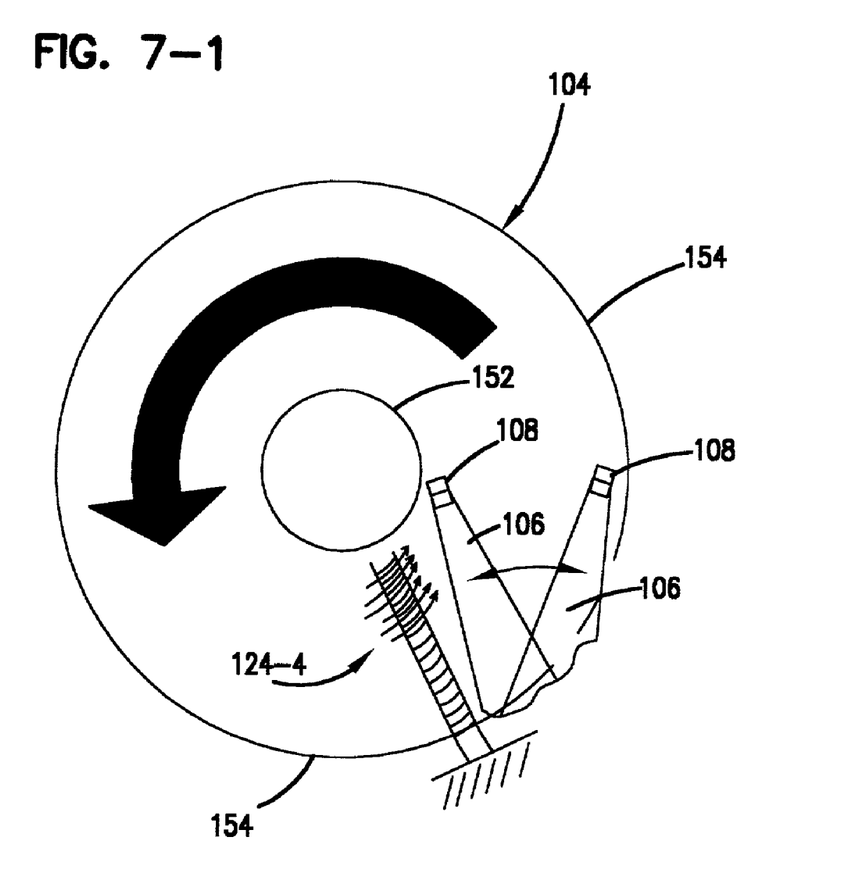
Figure 72:
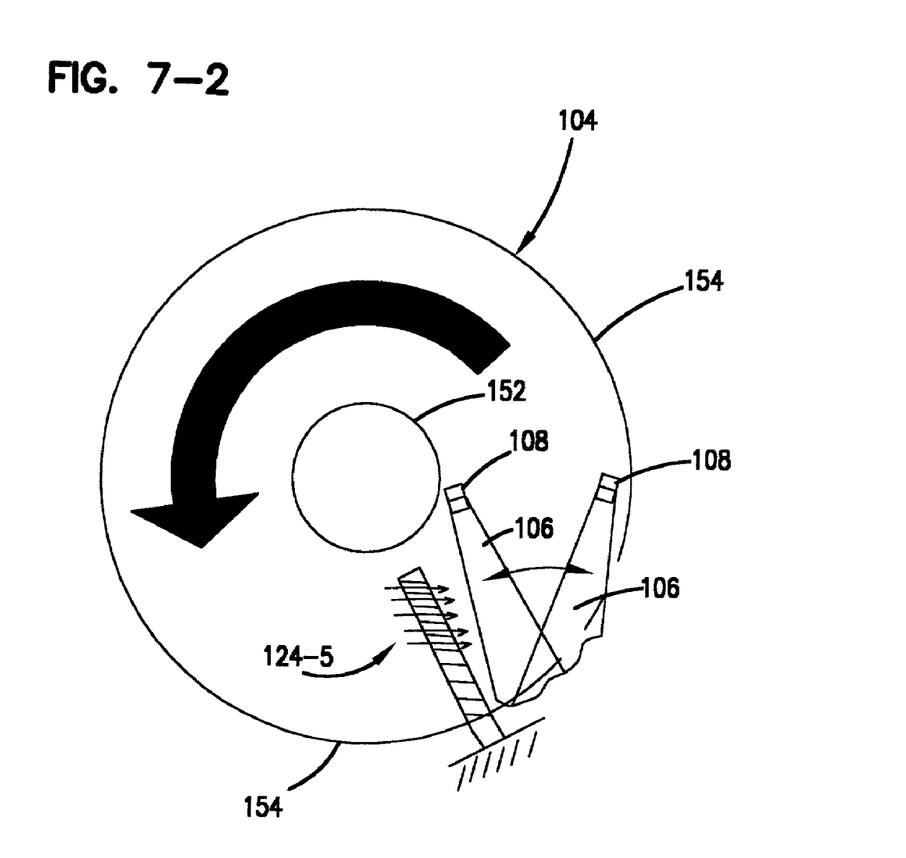

FIGS. 3-1 through 3-3 illustrate an alternate flow gate embodiment 124-2 formed of a block structure 140. As shown the block structure 140 similarly includes a plurality of flow passages 122-2 having an inlet 132-2 and outlet 134-2 (as illustrated in FIG. 3-3) to condition flow to reduce flow induced vibration as previously described. Alternate flow gate structures can be used and application is not limited to the particular embodiments shown. In particular, in the embodiment illustrated in FIG. 3-1, the flow gate structure is shown including three rows of flow gates 122-2 and in FIGS. 3-2–3-3, four rows of flow gates 122-2 are shown, however, application is not limited to any particular number of passage rows. In the illustrated embodiment, outer portion of block structure 140 includes a plurality of interfacing tips 141 which form open flow passages 122-2 which are not closed by a plate, or other structure. Tips 141 reduce surface area proximate to the disc surface to reduce shear force area upon which shear force acts to reduce drag.

Figure 4:
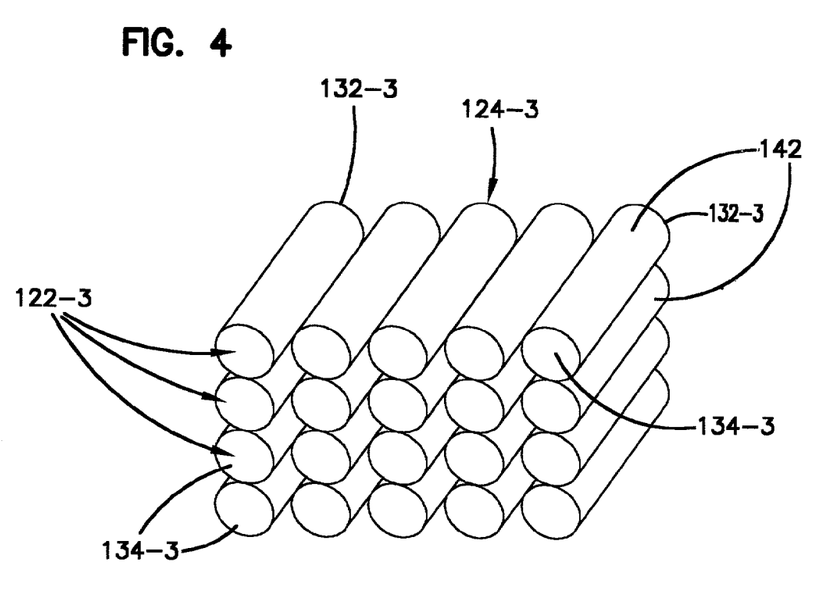
FIG. 4 is an illustration of an embodiment of a flow gate structure of a flow control device.

In an alternate embodiment illustrated in FIG. 4, flow gate 124-3 is formed of an array or a plurality of tubes 142. As shown, the plurality of tubes 142 form a plurality of streamline flow passage 122-3 having an inlet 132-3 and 134-3 to condition air flow in the flow field as previously described for the alternate embodiments.

Flow turbulence in the flow field increases proximate to the head assembly 106 as flow is constricted along the path of the head assembly 106. Turbulent flow along the head assembly 106 increases excitation or vibration of the suspension and head components. Thus, as illustrated in FIG. 5, flow gates as previously described can be positioned in the flow field to reduce flow turbulence upstream of the flow path to the head assembly 106 to limit excitation of the head assembly 106 (and non repeatable runout "NRRO") and downstream of the head assembly 106 to smooth flow turbulence of flow constricted by the head assembly 106.

Figure 5:
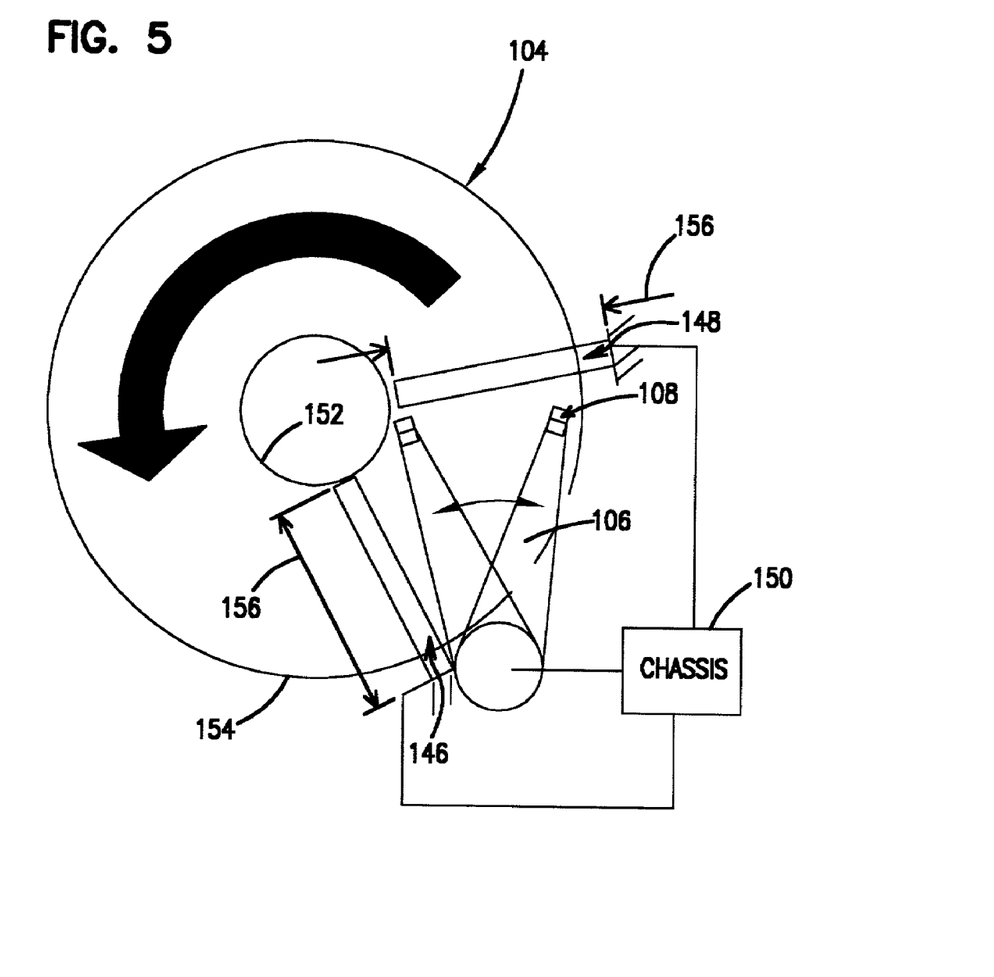
FIG. 5 is an illustration of an embodiment of a flow control or conditioning assembly including an inflow gate and an outflow gate for a head assembly.

As shown in FIG. 5, a first inflow gate 146 is positioned upstream of the head and suspension assembly and an outflow gate 148 is positioned downstream of the head assembly 106. Each of the inflow and outflow gates 146, 148 includes a plurality of streamline flow passages 122 as previously described to reduce turbulent flow. Inflow gate 146 is positioned upstream of the head assembly 106 to reduce turbulent flow to the head assembly 106 and outflow gate 148 is located downstream of the head assembly 106 to condition flow constricted or excited by the head assembly 106.

As shown in FIG. 5, inflow and outflow gates 146, 148 are supported relative to a chassis 150 of the disc drive (illustrated diagrammatically). Head assembly 106 is pivotally supported relative to the chassis 150 to move heads 108 between an inner position and an outer position (as shown in FIG. 5) relative to the inner and outer diameters 152, 154 of the disc 104 to read data from or write data to tracks on the disc 104. In the one embodiment shown, a width 156 of gates 146, 148 extends between the inner and outer pivot positions of the head assembly 106 to provide flow field control for the heads pivotally supported between inner and outer position as shown in FIG. 5 to reduce flow induced vibration. Although FIG. 5 illustrates a particular inflow gate 146 and outflow gate 148, application of the present invention is not limited to the particular arrangement of inflow gate 146 and outflow gate 148 shown in FIG. 5. Although a particular, orientation is illustrated for inflow and outflow gates 146, 148, application is not limited to any particular orientation of the inflow and outflow gates 146, 148 or any particular width therefor.

In alternate embodiments, the flow conditioning device provides flow directioning or flow direction control. In one embodiment illustrated in FIGS. 6-1–6-2, flow device includes a flow gate 124-4 which includes a plurality of flow directing passages 122-4. Passages 122-4 have a constant cross-sectional area or dimension and are angled or curved between inlet 132-4 and outlet 134-4 to control or shift the direction of flow as illustrated by arrows 158 through passages 122-4. As illustrated in FIG. 7-1, flow gate 124-4 can be positioned upstream of the head and suspension assembly 106 to direct flow generally inwardly toward the inner diameter 152 of disc 104 away from the suspension assembly to limit interference with the suspension components to reduce flow induced vibration. In an alternate embodiment illustrated in FIG. 7-2, flow gate 124-5 includes angled or curved passages to direct flow outwardly toward the outer diameter 154 of the disc away from the head and suspension assembly to limit interference with the suspension components to reduce flow induced vibration.

Figure 8:
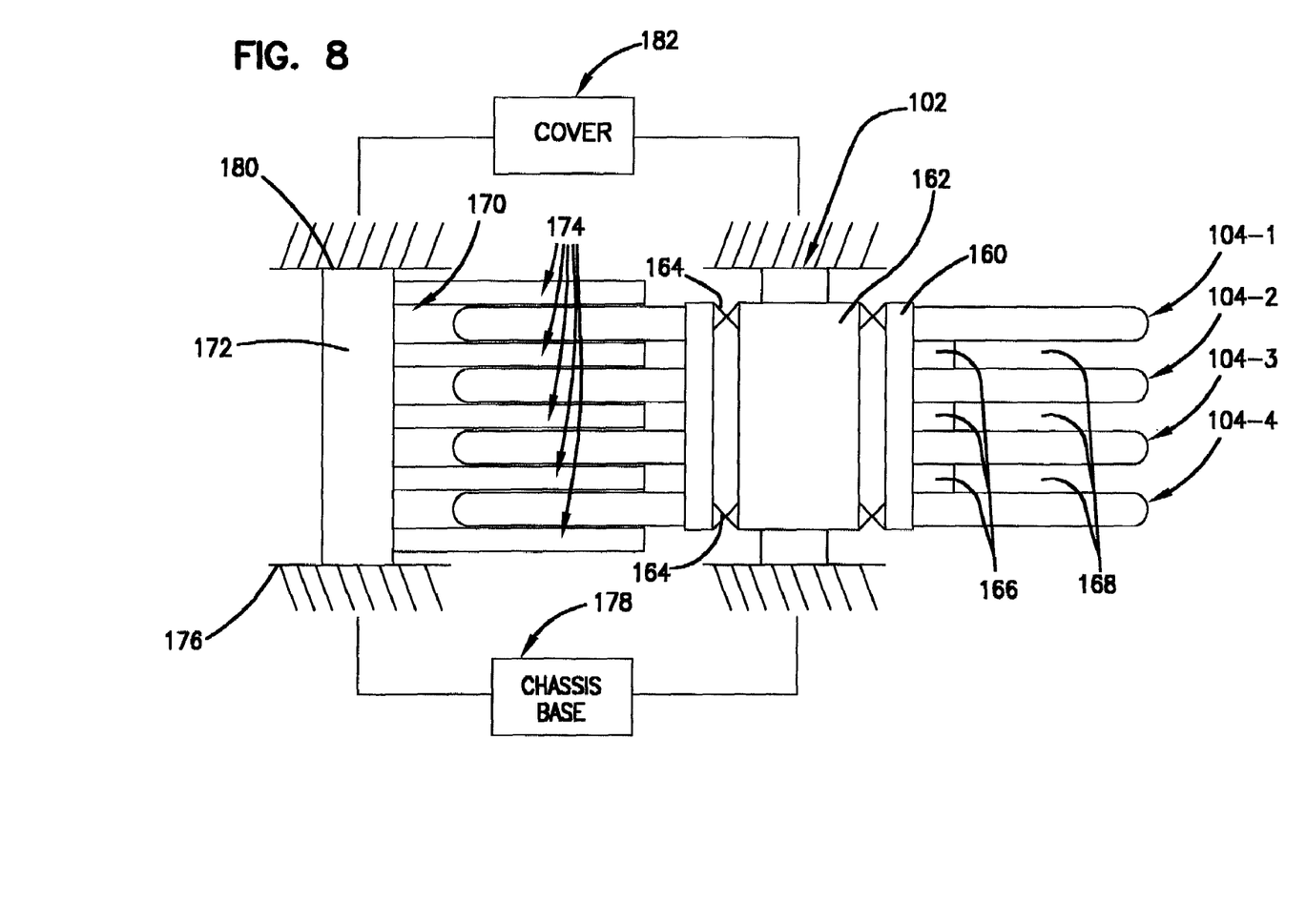
FIG. 8 is a schematic illustration of a flow control assembly for controlling flow in a flow field proximate to discs in a disc stack assembly.

Application of the present invention can be used to control flow field turbulence for a disc stack assembly. FIG. 8 illustrates a disc stack assembly including a plurality of discs 104-1, 104-2, 104-3, 104-4 supported by a spindle assembly 102 including a spindle hub 160 supported for rotation about a spindle shaft 162 via bearings 164 (illustrated schematically). As shown, discs 104 are stacked on hub 160 and separated by spacers 166 to form a plurality of gaps 168 therebetween. Flow field control is provided in gaps 168 between discs 104 of the disc stack by a flow control assembly 170 including a flow control block 172 supporting a plurality of stack flow gates 174 extending from the block 172. The stacked flow gates 174 include a plurality of streamline flow passages as previously described to limit flow induced vibration of the head and suspension components.

The flow control block 172 is supported relative to the chassis of the data storage device to support the stacked flow gates 174 in gaps 168 between the discs 104. The flow control assembly 170 is merged with the disc stack prior to assembly of the disc stack relative to chassis 150 of the disc drive. In the embodiment shown, control block 172 includes a first end 176 which secured to a chassis base 178 of the disc drive (illustrated diagrammatically) and a second end 180 secured relative to a chassis cover 182 of the disc drive (illustrated diagrammatically) to provide flow field vibration control as described. Flow control devices for upper and lower disc surfaces for outer discs 104-1, 104-4, respectively, can directly coupled to the chassis cover 182 and chassis base 178.

Figure 9:
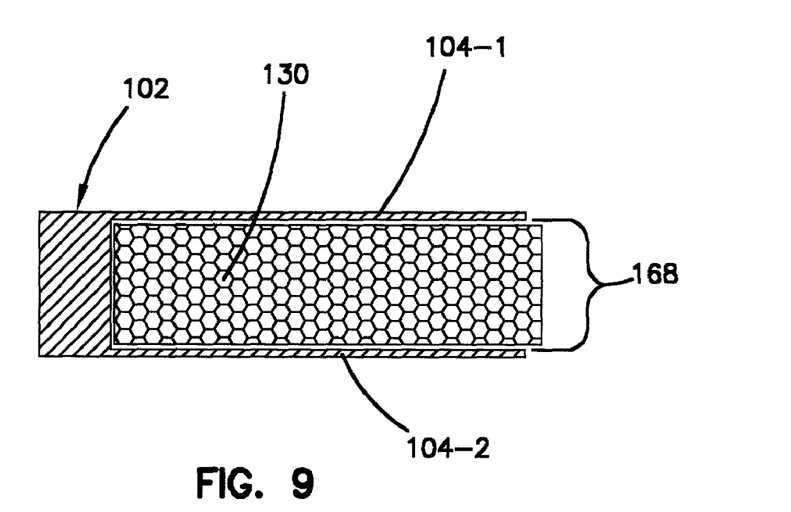
FIG. 9 is a schematic illustration of an embodiment of a flow control device supported in a gap between adjacent discs in a disc stack.
Figure 10:
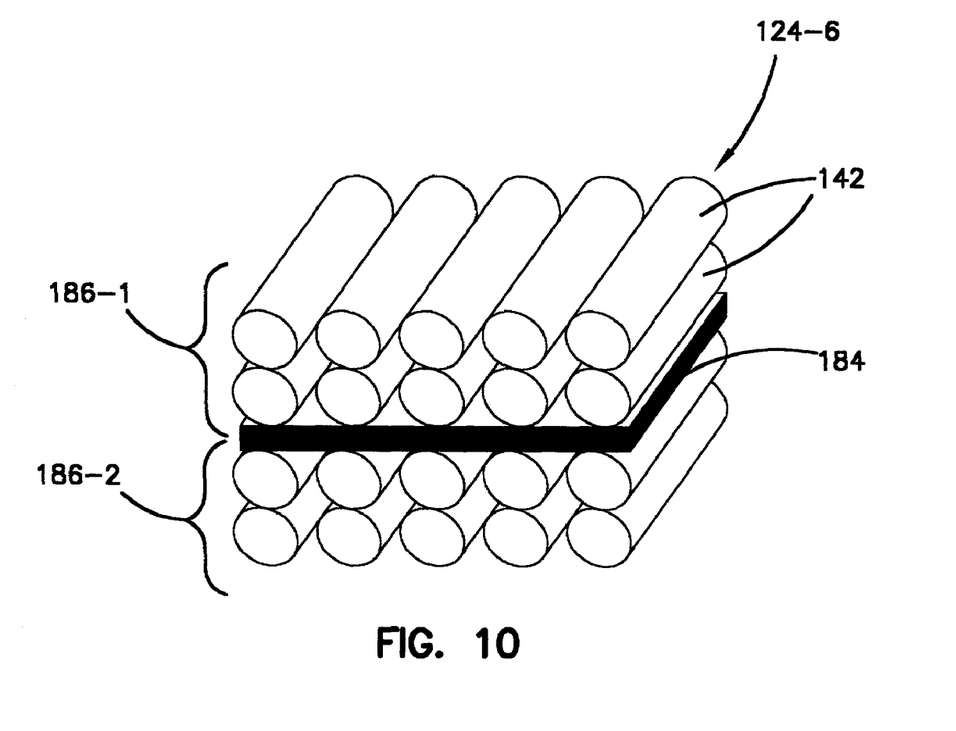
FIG. 10 is a schematic illustration of an embodiment of a flow control device supported in a gap between adjacent discs in a disc stack.

In an embodiment illustrated in FIG. 9, honeycomb structure 130 is supported in gap 168 to form a flow gate or control device for lower surface of disc 104-1 and upper surface of disc 104-2. In the embodiment of FIG. 10, flow gate 124-6 includes a plurality of tubes 142 supported on plate 184. Plate 184 is supported relative to discs 104 (for example in gap 168). In the embodiment shown, plate 184 supports first and second flow gate portions 186-1, 186-2 to provide a flow conditioning device for a lower surface of a first disc and an upper surface of a second disc supported in stacked relation. The plate 184 forms a blockage in the flow field to slow air flow and reduces flow energy in the flow field thereby reducing excitation on the suspension components and the head.

Figure 11:
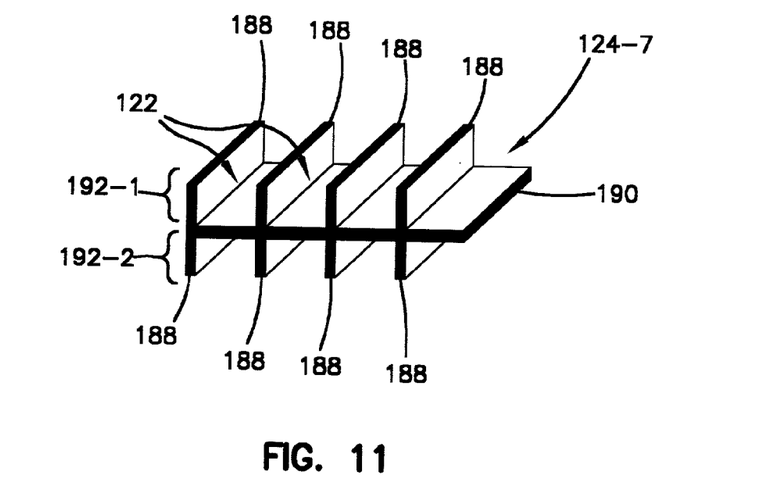
FIG. 11 is a schematic illustration of an embodiment of a flow control device supported in a gap between adjacent discs in a disc stack.

In the embodiment illustrated in FIG. 11, the flow gate 124-7 includes a plurality of flow passages 122 formed by fins 188 supported on and extending from plate 190. In the embodiment shown, plate 190 supports first and second flow gate portions 192-1, 192-2 to provide flow conditioning for a lower surface of a first disc and an upper surface of a second disc supported in stacked relation. The plate 190 also restricts flow passage to reduce turbulence energy to provide a more laminar flow along the flow field. Although particular flow device structures are illustrated in FIGS. 9–11, application is not limited to the particular embodiments or arrangements shown.

Figure 12:
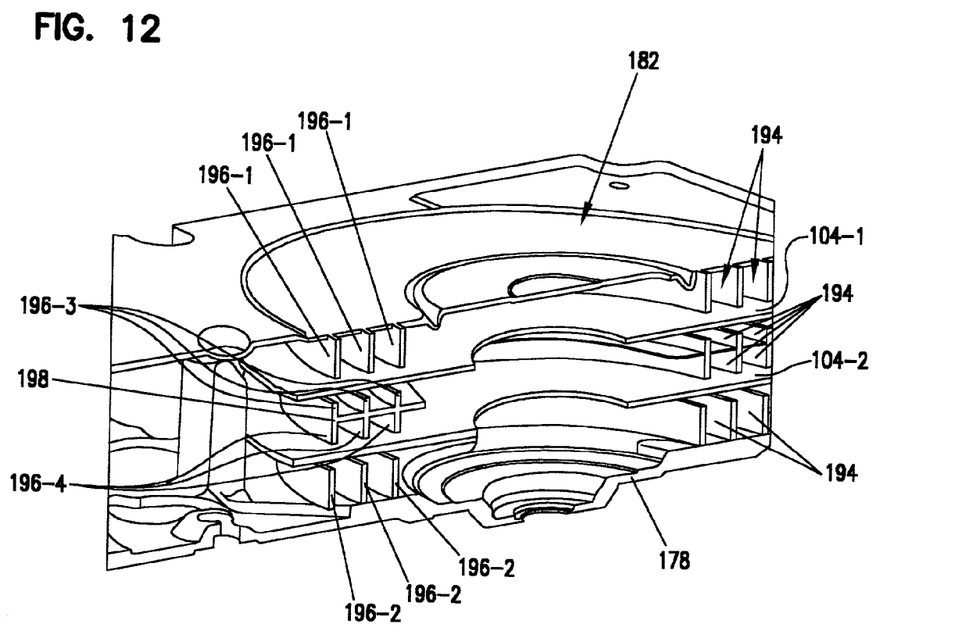
FIG. 12 is a perspective illustration of a flow control assembly for a disc stack including circumferential radially spaced flow passages formed between fins.
Figure 13:
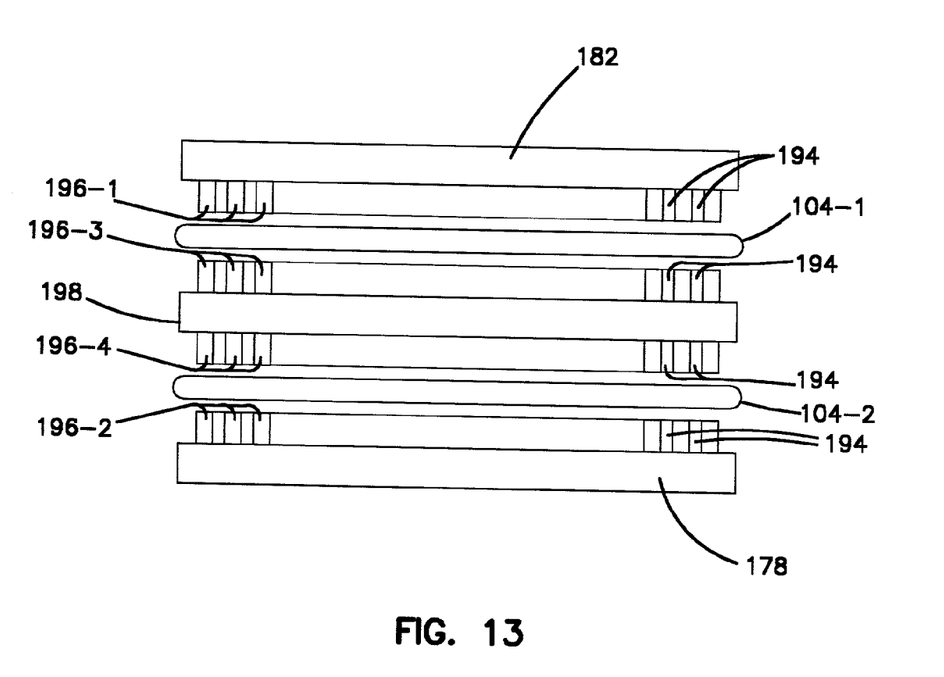
FIG. 13 is a schematic elevational view of the embodiment of FIG. 12.

FIGS. 12–13 illustrate an alternate flow control embodiment. As shown in FIG. 12–13, the flow control device extends about the circumference of a disc. The illustrated device includes a plurality of radially spaced circumferential flow passages 194 extending about a circumference of the disc between the inner diameter and the outer diameter of the disc. In the embodiment shown, the circumferential flow passages 194 are formed by circumferential radially spaced fins 196. FIG. 12 illustrates an embodiment of a circumferential flow control device for a disc stack including discs 104-1, 104-2. As shown fins 196-1, 196-2 are supported on a base cover 182 and chassis base 178, respectively to form flow passages for upper surface of disc 104-1 and lower surface of disc 104-2. Fins 196-3, 196-4 are supported on plate 198 to form fins for lower surface of disc 104-1 and upper surface of disc 104-2, respectively. Plate 198 is disc shaped similar to the magnetic recording discs 104. Circumferential fins 196 provide streamline flow passages to "break up" large vortices to reduce pressure imbalances on the disc surfaces reducing disc flutter for improved trackability and reduce pressure and velocity fluctuations acting on suspension assemblies and actuator arms supporting the suspension assemblies.

The present invention relates to a flow control device for a data storage system to reduce flow induced vibration. In one embodiment the flow control device includes a flow gate (such as 124) including a plurality of streamline flow passages (such as 122) to reduce turbulent flow in a flow field along the disc surface. In one embodiment flow gate (such as 124) is positioned upstream of a head suspension assembly and/or down stream of the head suspension assembly. In another embodiment, the flow control device includes a plurality of circumferential radially spaced flow passages (such as 194).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment is illustrated for a magnetic disc drive, it will be appreciated by those skilled in the art that the teachings of the present invention can be applied to other systems, like optical or magneto-optical systems, without departing from the scope and spirit of the present invention.

What is claimed is:

1. An assembly comprising:
   at least one disc;
   a spindle assembly rotationally supporting the at least one disc to form a flow field along a surface of the at least one disc via rotation of the at least one disc;
   a head assembly positionable proximate to the surface of the at least one disc, and
   a flow controller including a flow gate supported in the flow field along the disc surface of the at least one disc having a leading edge having a plurality of rows of radially spaced inlets and a trailing edge including a plurality of rows of radially spaced outlets and the flow gate including a plurality of rows of radially spaced streamline flow passages between the plurality of rows of inlets at the leading edge and the plurality of rows of radially spaced outlets at the trailing edge and wherein the plurality of rows of radially spaced inlets, outlets and streamline flow passages associated with the flow gate in the flow field of the at least one disc are not separated by one or more discs.

2. The assembly of claim 1 wherein the flow gate is supported upstream of flow of the flow field to the head assembly.

3. The assembly of claim 1 wherein the flow gate is supported downstream of flow of the flow field from the head assembly.

4. The assembly of claim 1 wherein the flow controller includes a plurality of flow gates supported in the flow field along the disc surface of the at least one disc.

5. The assembly of claim 4 wherein the plurality of flow gates includes an inflow gate to condition flow to the head assembly and an outflow gate to condition flow excited by the head assembly.

6. The assembly of claim 1 wherein the flow controller includes a honeycomb structure forming the plurality of rows of radially spaced streamline flow passages.

7. The assembly of claim 1 wherein the flow gate includes a block structure including the leading edge and the trailing edge having the plurality of rows of radially spaced inlets formed along the leading edge of the block and the plurality of rows of radially spaced outlets formed along the trailing edge of the block and the plurality of rows of radially spaced streamline flow passages therebetween.

8. The assembly of claim 1 wherein the flow controller includes an array of tubes forming the plurality of rows of radially spaced streamline flow passages.

9. The assembly of claim 1 wherein the head assembly is pivotally supported to move between an inner position and an outer position and a width of the flow gate extends between the inner and outer positions of the head assembly to condition flow to the head assembly.

10. The assembly of claim 1 wherein the spindle assembly supports a plurality of discs spaced to form a gap therebetween and the flow gate is supported in the gap between the plurality of discs.

11. The assembly of claim 10 wherein the flow controller includes a plurality of flow gates supported relative to the plurality of discs and each of the plurality of flow gates includes the plurality of rows of radially spaced streamline flow passages.

12. The assembly of claim 1 wherein the plurality of rows of radially spaced streamline flow passages include a constant cross-sectional area or dimension between the plurality of inlets and the plurality of outlets.

13. The assembly of claim 1 wherein the flow gate is positioned between an inner diameter and outer diameter of the at least one disc.

14. In combination;
a spindle assembly including a plurality of stacked discs rotatable to induce a flow field along a surface of each of the plurality of stacked discs by rotation of the plurality of stacked discs; and
a plurality of spaced flow devices supported in the flow field of the plurality of discs and the plurality of flow devices including adjacent flow devices and the adjacent flow devices including a leading edge and a trailing edge and including a plurality of rows of radially spaced streamline flow passages between a plurality of inlets at the leading edge and a plurality of outlets at the trailing edge of adjacent flow devices and wherein the adjacent flow devices and the plurality of radially spaced streamline flow passages of the adjacent flow devices are not separated by multiple discs.

15. The combination of claim 14 wherein the plurality of radially spaced streamline flow passages of the plurality of flow devices include a plurality of opened channels between opposed side edges of the plurality of streamline flow passages along a length of the streamline flow passages between the leading edge and the trailing edge thereof.

16. The combination of claim 14 and further comprising:
a head assembly supporting heads relative to the surfaces of the plurality of discs and the plurality of flow devices include a flow gate supported upstream of flow of the flow field to the head assembly.

17. The combination of claim 14 and further comprising:
a head assembly supporting heads relative to the surfaces of the plurality of discs and the plurality of flow devices include a flow gate supported downstream of flow of the flow field from the head assembly.

18. The combination of claim 14 wherein the plurality of radially spaced streamline flow passages include a plurality of radially spaced circumferential flow passages.

19. The combination of claim 14 wherein the radially spaced streamline flow passages are contoured to redirect the flow field.

20. The combination of claim 14 wherein the plurality of flow devices includes a flow device for each of the plurality of discs of the spindle assembly and each of the plurality of flow devices includes the plurality of radially spaced streamline flow passages.

21. A flow controller to control flow in a flow field along a disc surface of a data storage device comprising:
a flow gate supported in the flow field having a leading edge having a plurality of rows of radially spaced inlets and a trailing edge including a plurality of rows of radially spaced outlets and the flow gate including a plurality of rows of radially spaced streamline flow passages between the plurality of rows of inlets at the leading edge and the plurality of rows of radially spaced outlets at the trailing edge and wherein the plurality of rows of radially spaced inlets, outlets and streamline flow passages associated with the flow gate in the flow field are not separated by one or more discs.

* * * * *